(12) United States Patent
Rocha

(10) Patent No.: US 12,597,780 B2
(45) Date of Patent: Apr. 7, 2026

(54) SEMI-AUTONOMOUS ELECTRIC POWER GENERATION SYSTEM AND OPERATION METHOD THEREOF

(71) Applicant: ECOGENSELF, S.A. DE C.V., Mexico City (MX)

(72) Inventor: Salvador Nava Rocha, Cdmx (MX)

(73) Assignee: ECOGENSELF, S.A. DE C.V., Mexico City (MX)

( * ) Notice: Subject to any disclaimer, the term of this patent is extended or adjusted under 35 U.S.C. 154(b) by 0 days.

(21) Appl. No.: 18/396,925

(22) Filed: Dec. 27, 2023

(65) Prior Publication Data

US 2024/0223002 A1 Jul. 4, 2024

Related U.S. Application Data

(60) Provisional application No. 63/436,052, filed on Dec. 29, 2022.

(51) Int. Cl.
*H02J 7/14* (2006.01)
*B60L 53/60* (2019.01)
*H02J 15/00* (2006.01)

(52) U.S. Cl.
CPC ............. *H02J 7/1423* (2013.01); *B60L 53/60* (2019.02); *H02J 15/00* (2013.01); *B60L 2210/10* (2013.01); *H02J 2207/20* (2020.01)

(58) Field of Classification Search
CPC ...... H02J 7/1423; H02J 15/00; H02J 2207/20; B60L 53/60; B60L 2210/10
See application file for complete search history.

(56) References Cited

U.S. PATENT DOCUMENTS 8,729,720 B1 5/2014 Camilo
8,994,215 B1 3/2015 Davis
(Continued)

FOREIGN PATENT DOCUMENTS

ES 2686270 T3 10/2018
MX 2022000559 U 9/2022
(Continued)

OTHER PUBLICATIONS

Angrist S W: "Perpetual Motion Machines", Scientific American, Scientific American Inc., New York, NY, US, vol. 218, No. 1, Jan. 1, 1968 (Jan. 1, 1968), pp. 114-122, XP002036811, ISSN: 0036-8733 * the whole document*.

(Continued)

*Primary Examiner* — Carlos Amaya
(74) *Attorney, Agent, or Firm* — Leason Ellis LLP

(57) ABSTRACT

The invention relates to a semi-autonomous electric power generation system and the method of operation thereof. Wherein the semi-autonomous electric power generation system is configured in such a way that it is possible to obtain an energy efficiency of at least 90% of the nominal design value on a constant basis. Likewise, the method used for the operation of the system considers reaching a discharge limit value of approximately 20% of the remaining charge of one of the battery banks to start a recharging process while another battery bank supplies current to the motor that drives the alternators that generate the electrical energy, repeating these processes alternately to maintain the constant operation of the system and to generate the necessary energy to carry out at the same time the recharge of the battery bank that is discharged.

16 Claims, 5 Drawing Sheets

(56)  References Cited

U.S. PATENT DOCUMENTS

| | | | |
|---|---|---|---|
| 9,768,632 | B2 | 9/2017 | Mitri et al. |
| 2012/0299531 | A1 | 11/2012 | Prosser et al. |
| 2018/0219406 | A1 | 8/2018 | Prieto |
| 2022/0028625 | A1 | 1/2022 | Macaluso |
| 2023/0344254 | A1 | 10/2023 | Ricketts |

FOREIGN PATENT DOCUMENTS

| | | | |
|---|---|---|---|
| WO | 2020050963 | A1 | 3/2020 |
| WO | 2021255445 | A2 | 12/2021 |
| WO | 2022129538 | A1 | 6/2022 |

OTHER PUBLICATIONS

European Search Report in EP Application No. 23220829, mailed Jun. 3, 2024 (3 pages).
International Search Report in PCT Application No. PCT/MX2023/050076, mailed Apr. 25, 2024 (4 pages).

Entity

SEMI-AUTONOMOUS ELECTRIC POWER GENERATION SYSTEM AND OPERATION METHOD THEREOF

CROSS-REFERENCE TO RELATED APPLICATION

This application claims priority to U.S. Patent Application 63/436,052, filed on Dec. 29, 2023, entitled "Transportable self powered electricity generator" which is incorporated herein by reference.

TECHNICAL FIELD

The present invention relates to apparatuses and/or devices for the generation of electricity, stationary and mobile electricity generators, renewable energies, electric vehicles, the problem of energy, commercial, industrial, medical, military, private and emergency energy consumption, among others.

BACKGROUND

In the technical field of the invention there are many types of systems of electric power generation, such as hydroelectric plants, however, the construction as well as its installation represent considerable costs, in addition to the fact that it is not always possible to have access to this type of facilities, for example, there are activities or needs for the supply of electrical energy such as exploration, mining, camps, cities, temporary emergency hospitals, etc., which are sometimes interrupted due to natural disasters and there is no way to avoid such interruption because moving a hydroelectric plant to where it is needed is complicated. Another option is electric generators that consume fossil fuels, whose consumption costs per operation are very high, in addition to generating polluting and harmful emissions for human beings that make it dangerous to work in closed or poorly ventilated places, in addition to the noise and heat they generate. Others are renewable energy systems, which are expensive, and need a lot of space to install as well as require specific environmental conditions for their operation and cannot be transported to other locations without the risk of failure. Some are eco-friendly and efficient, but very expensive and considered high-risk and totally counterproductive in the event of an accident, although they all work, there is still a global energy problem due to the costs of energy supply and production.

In the state of the art, are well known different systems and/or devices developed to solve the problems mentioned above.

From U.S. Pat. No. 9,768,632 B2 is known a hybrid energy storage and electrical generation apparatus that comprises an apparatus that regenerates and stores electrical energy as chemical potential energy in a battery to convert it into mechanical energy as needed in order to spin an electric generator to service a load and use a portion of that generated electricity to recharge a battery. Likewise, from U.S. Pat. No. 9,768,632 B2 it is known a method of production and distribution of the energy produced from a hybrid appliance. The hybrid apparatus is composed of a motor, an alternator, an inverter, a charger, preferably a plurality of batteries in one or more banks (energy conservation unit or PPU), a control assembly preferably comprising a plurality of circuit breakers, contactors, and sensors, an external load ("L-ext"), and several program logic controllers (hereinafter referred to as PLC) where preferably each PLC has a display and a variety of other components.

From US 2023/0344254 A1 it is known a mobile generator charging system and method that is transportable and capable of moving from one location to a second location associated with a vehicle, aircraft, vessel, building, or other object that needs to be powered. Where the system may have a first charger that may be connected to an aircraft, vehicle, vessel, building, or other object that has at least one battery, and a second charger connected to an on-board battery pack, as well as one or more programmable logic controllers (PLCs) that manage communication between the aircraft, vehicle, vessel, building, or other object and the onboard battery pack to ensure that at least one battery reaches a preset state of charge (SOC) and the on-board battery pack reaches the preset SOC.

Likewise, from US document 2023/0344254 A1 is known a method for managing, by means of at least one PLC, the communication between a vehicle, a vessel or an aircraft, a first charger and a second charger; to manage, by means of at least one PLC, at least one power source to supply power to the first charger and the second charger; to ensure, by means of at least one PLC, that the first charger provides at least one battery associated with the vehicle, vessel or aircraft with a preset state of charge (SOC); to ensure, by means of at least one PLC, that the second charger provides the on-board battery pack with the preset SOC; and initiate a connection, using at least one PLC, to allow the transfer of energy from the on-board battery pack to at least one battery associated with the vehicle, vessel or aircraft.

From document MX/u/2022/000559, it is known a hybrid system that is made up of an electric motor which generates mechanical energy to be applied in a device. The system also has an electric generator and a propulsion motor connected in series, where the electric generator must be of such a capacity that it can electrically supply the electric motor of the vehicle and must also have a feedback connection that also provides power to the propulsion motor. The electric motor is ideally of a capacity of 12 volts, however, it can be of a higher or lower capacity, depending on the needs of the project. It also has a rechargeable battery, ideally 12 volts, which provides power to the propulsion motor that will start and start the electric generator; once the electric generator is switched on, it generates electricity that is feedback to the propulsion motor by means of a voltage regulator and at the same time generates the electricity to start the electric motor that will remain on. A feedback connection replenishes the energy consumed from the rechargeable battery and replenishes the drive motor. A voltage regulator is installed in the feedback connection, which transforms the output voltage of the drive motor to the input voltage level of the electric generator.

From U.S. Pat. No. 8,994,215 B1 it is known a system that includes a battery unit configured to supply power to the self-recharging electric generator system, an automatic switching unit configured to switch between a main power supply source and the self-recharging electric generator system, at least one electric motor configured to receive power from the battery unit, and at least one generator configured to produce power to be supplied to the external system when a failure occurs in the main power supply source, where the power produced by at least one generator is further supplied to the automatic switching unit for performing continuous recharging of the self-recharging electric generator system. The system known from U.S. Pat. No. 8,994,215 B1 can be implemented with the use of an uninterruptible power supply (UPS) battery unit, a self-contained rechargeable power system, or with other external power supply sources including renewable energy sources such as solar panels and wind turbines.

From the US 20180219406 A1 document, it is known an electrical charging system that includes at least one motor, an alternator, a first-power inverter, a battery-charger and a fuse panel. It is also known the use of at least one battery assembly that includes a direct current configured to output a direct current power supply. The at least one motor is configured to receive the direct current power supply from the at least battery assembly to produce rotative mechanical energy, and where the at least one alternator can be mechanically coupled to the at least one motor that is configured to convert the rotative mechanical energy to direct current electrical energy, and is further configured to power the battery assembly via the direct current electrical energy. The first-power-inverter can be electrically coupled to the at least one alternator where the battery-charger is electrically coupled and configured to provide direct current to recharge the at least one battery assembly. It is known that the system may include a second battery assembly electrically arranged in parallel with a first battery assembly or may be electrically arranged in series with a first battery assembly.

From ES 2 686 270 T3 it is known that a converter has a pump driven by natural force, e.g. waves, by means of which a hydraulic machine arrangement made with at least one hydraulic machine can be driven, which in turn is coupled to an electrical machine to convert mechanical energy into electrical energy. The converter is made with a regulating circuit, by means of which the adjustable hydraulic machine can be adjusted so that a predetermined force or a predetermined pressure difference is applied to the piston of the piston pump.

From the U.S. Pat. No. 8,729,720 B1 it is known a system that includes a crankshaft, a speed multiplier, a first electrical generator, a transformer and a fluid power circuit. The speed multiplier is coupled to the crankshaft by way of a low-speed shaft. The first electric generator is coupled to the speed multiplier by way of a high-speed shaft. The transformer is configured to receive electricity produced by the first electric generator. The transformers output electricity is used to power the fluid power circuit. The fluid power circuit is reciprocally coupled to the crankshaft, so that the operation of the fluid power circuit sets the crankshaft in motion. The fluid power circuit can be an oleo-hydraulic circuit or a pneumatic circuit. A rotor and fluid-propelled turbine can also be affixed to the crankshaft in order to set the crankshaft into motion.

From WO 2020050963 A1 it is known a system that includes a speed multiplier, a generator, a transformer and a fluid power mechanism. The speed multiplier is coupled to the fluid power mechanism and the generator. The transformer is coupled to the generator and fluid power mechanism. The system is initially set in motion by an initial input energy supplied to the fluid power mechanism. The fluid power mechanism rotates a low-speed shaft that actuates the speed multiplier. The speed multiplier rotates a high-speed shaft at a rotational speed that is converted into input energy and output energy by the generator. The output energy supplies power to an external system. The input energy is transfers through the transformer back to the fluid power mechanism, thereby self-propelling the fluid power mechanism and keeping the system in motion to reproduce the output energy.

The drawbacks of the electrical generation systems known in the state of the art, for example, dimensions, weight, complexity for transportation, manufacturing and maintenance costs are solved by the present invention since it presents a more compact configuration than those known so far, which makes it transportable and of low manufacturing cost.

The present invention also refers to an electric power generation system that provides more power than any known generation system can deliver, and all this is achieved by the implementation of a hydraulic system that potentiates the mechanical energy produced by the operation of an electric motor to power a pair of alternators.

An advantage of the present invention is that it allows an electrical energy output for service that can reach at least 90% of the nominal design value on a constant basis.

Another advantage of the present invention is that it does not require an additional power supply device to maintain the operation of the system since it is a self-recharging system.

BRIEF DESCRIPTION OF THE INVENTION

An objective of the present invention is to provide a semi-autonomous electric power generation system, comprising, in general, a housing containing: at least one electric motor, at least two alternators, connected in series with the electric motor, a programmable processing unit, various controllers to control the operation of the elements, various contactors to manage the operation of the elements of the system, miscellaneous chargers, at least two self-recharging battery banks, at least one temperature indicator, a cooling system, at least one charge indicator of the at least two battery banks, at least one alternative starting system, fuses, fuse box and general circuitry.

In one embodiment of the present invention, the programmable processing unit can be of the Arduino and/or PLC type.

In another embodiment, the present invention includes a hydraulic system to potentiate the energy fed to the alternators, improving the output service load.

Another objective of the present invention is to provide a method of operation of a semi-autonomous electric power generation system, where the method essentially involves providing and using a programmable processing unit to hold programming instructions and sending electromagnetic pulses to various contactors to manage the changes from, for example, an on state to an off state and vice versa of the system. In addition, the programmable processing unit comprises the instructions for managing changes in the charging and discharging stages of the battery banks in each set period, where the battery banks are connected to charge controllers to manage the power of the on-board charger and thus adjust the time and capacity as required by the battery banks.

The method also involves using a battery management system (BMS) to keep the batteries in order and monitored so that the charging system works properly in a timely manner.

The method involves powering the system through a DC/DC converter or an AC/DC motor, as well as other elements, which is powered by one of the battery banks during a period of operation.

The method foresees that the batteries that comprise the battery banks will not be discharged less than 20%, increasing their capacities, quantities, qualities, and power generation.

Moreover, the method is designed so that all programming systems that manage the elements are connected to a resistant digital control display that will have pre-programmed cycles for work schedules, continuous use or shutdown, information and markers, temperature control, as well as the option to activate an alternative power supply.

According to the method of the present invention, the temperature can be manually or automatically adjusted thanks to a thermometer that is connected to the programmable processing unit (Arduino or PLC type), in which the temperature values are programmed, wherein the management cycle of the pre-programmed operating modes sends pulses that synchronously make the pertinent changes in time and form, to supply the energy for recharging the batteries.

According to the method, the contactors are configured to receive the command from the programmable processing unit, which releases the energy from the battery banks, to the controllers that manage the motor power, but this time it will be the contactors which will give access to the energy to powering the indicated controller, wherein the potentiometer is adjusted to the RPM required by the alternators, commonly, but not limited to 1600 rpm or 1800 rpm depending on capacity. In the same way, the motor is additionally programmed, to sustain the voltage of the alternators and once recharged, the operation starts and that start cycle is programmed by means of the programmable processing unit (Arduino or PLC type) and other improved programmable devices.

Also, according to the method, after a period of three hours, a programmed 12 volts contactor associated with the programmable processing unit is activated, which will allow the input of energy from the battery banks that were previously charged for three hours, to the corresponding controller, which will manage the energy from the batteries to the motor, which will drive a service alternator, which will provide the electricity to keep the programmable processing unit on, and the 220 volts, 50 amperes fuse box for the level 2 chargers of 40 amperes, which keep the battery banks recharged, by means of contactors whose indications come from the programmable processing unit, for changing bank in operation, bank to recharge and bank to discharge.

According to the method, once the first cycle is completed, which takes approximately five hours, the battery banks will continue to be recharged for three hours, then the contactors will allow the power from the battery bank to pass to the controller assigned by the programmable processing unit, keeping the motor in motion. Contactor changes will be synchronized with their corresponding battery bank, to keep the elements in motion, in a timely manner.

According to the method, once the initial charge has been carried out, the motor is efficiently powered by the battery banks which continue to be recharged for three hours, each time a battery bank is discharged due to the movement of the motor, for a time of approximately five hours, which will drive two alternators or dynamo generating the required electricity on site.

According to the method, the motor is connected to a type (T) terminal block, where the motor receives current from two controllers, which in turn are powered by two 12 volts contactors that allow the power to pass through one controller at a time while the other, waits for the battery bank to recharge in the recharge turn, which receives the recharge from the level 2 chargers, and the on-board charger according to the set recharge turn, provided by the contactors and the programmable processing unit, the chargers are waiting to be reactivated with a new discharged battery bank, once the new bank is recharged, the contactors supply the energy to the motor to keep it turning at the rhythm and time indicated by the controllers, so that the alternators or dynamos continue to generate energy thanks to the movement of the motor and all the elements that comprise the system.

DESCRIPTION OF DRAWINGS

The above and other features and advantages of the invention will become more apparent to the skilled in the art by describing the invention in detail in combination with the drawings accompanying this document, where.

DETAILED DESCRIPTION

In the following detailed description, reference is made to the accompanying drawings showing specific embodiments of the present invention. It is understood that other embodiments may be employed or configured, that there may be changes in the use of similar or equivalent elements without departing from the essence and scope of the present invention.

The invention mainly relates to a semi-autonomous electric power generation system and the method of operation thereof. Where the semi-autonomous electric power generation system is configured in such a way that it is possible to obtain an energy efficiency of at least 90% of the nominal design value on a constant basis. Likewise, the method used for the operation of the system considers reaching a discharge limit value of approximately 20% of the remaining charge of one of the battery banks to initiate a recharging process while another battery bank supplies current to the motor that drives the alternators that generate the electrical energy to maintain the constant operation of the system and in turn generate the necessary energy to carry out at the same time the power recharge of the battery bank that is discharged.

Figure 1:
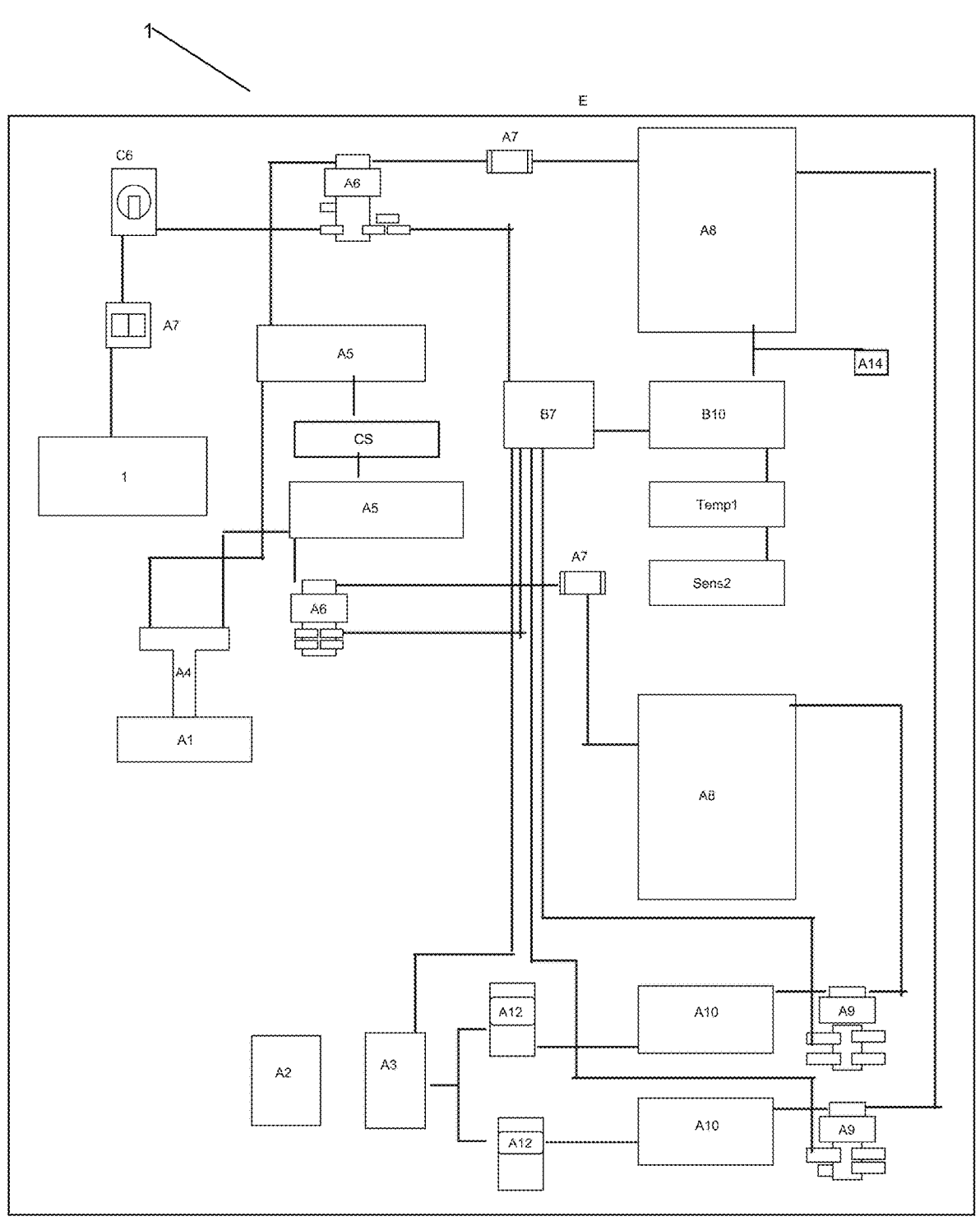
FIG. 1 shows an overview of the semi-autonomous power generation system.

According to FIG. 1, a semi-autonomous electric power generation system (1) according to an embodiment of the present invention consists of a housing (E3) (not shown) containing inside: at least one AC/DC electric motor (A1) that is powered by a module of at least two battery banks (A8) and by at least two controllers (A5) in an automated manner. Wherein the motor (A1) is a known electric motor and can present the following technical specifications, for example, but not limited to, a power of 200 hp, at 6000 rpm, 250 volts and 500 amperes. In addition, at least one electric motor (A1) can also be of 75 hp or 100 hp. Wherein a motor support is a support plate, and that, depending on the motor support, it is secured with fasteners. Fasteners can be any of those types known in the technical field of the invention and which are in harmony with the remaining elements of the system. According to the invention, the material from which the housing comprising the elements of the system is constructed may be at least one selected from metal, steel, metal alloys, plastic, synthetic fibers, wood, or combinations thereof.

The electric motor (A1) drives a service alternator or dynamo (A2), which feeds power to at least two chargers (A12) and (A10), which in turn supply the charge of the at least two battery banks (A8) which in turn also drive an alternator or dynamo (A3) that is responsible for the necessary electrical supply, and which is different from the service alternator or dynamo (A2). Wherein the batteries of the at least two battery banks can be one of lithium batteries, Al-air batteries, hydrogen batteries, metal ion batteries, lead acid batteries, or combinations thereof.

According to the invention, the service alternator (A2) which is driven by the electric motor (A1) generates electricity to power the chargers (A12) which together with the charger (A10) reduces the recharging time of the battery banks (A8), the alternator or dynamo for service (A2), is of lower power due to the use it provides when powering chargers (A12), for example, 40 amperes or more, at least 20 kW, 220 volts, 1800 rpm, 60 hz depending on the type of charger.

A terminal block (A4) type T, which receives the necessary power supply from one of the at least two controllers (A5), to power the motor according to the program of the controller in turn, while the other controller (A5) of the at least two controllers (A5) waits for the assigned battery bank (A8). Wherein the at least two controllers (A5) are controllers commonly used in electric vehicles to increase the efficiency and performance of a motor, in this case the electric motor (A1), and these have multiple capabilities and features. For example, if it is used in different configurations and quantities, higher performance is obtained, and it can be programmed to stay at the same speed.

In a particular embodiment, the at least two controllers (A5) are of 200 to 350 volts, 1000 amperes and are cooled by a cooling system (CS) that uses liquid. A conventional cooling system can also be used.

The semi-autonomous electric power generation system (1) of the present invention also comprises a set of at least two contactors (A6-1, A6-2) that are controlled by a programmable processing unit (B7). Wherein said at least two contactors (A6-1, A6-2) are responsible for supplying the energy from the at least two battery banks (A8) to the at least two controllers (A5) that power the motor (A1) in a synchronized manner, in such a way that the electric motor (A1) carries on working, said contactors (A6) work at 12 volts, and every five hours they receive and exchange energy from one of the at least two banks of batteries (A8) recharged according to the programming of the corresponding controller (A5).

From the same FIG. 1 it is seen that the semi-autonomous electric power generation system (1) also includes a set of fuses (A7), which are responsible for the safety of the elements that comprises the system. According to the invention, fuses of different capacities can be used, as required. In one embodiment of the invention, it may be used, but not limited to, 500 amperes fuses.

According to the invention, at least two battery banks (A8) store the energy of the at least two 40 amperes chargers (A12) and of the at least two on-board chargers (A10) of 6.6 kW each one. In this sense, the at least two on-board chargers (A10), accelerate the recharge to three hours, the at least two battery banks (A8) in this case are, for example, of 250 volts and 200 amperes each one, without being limited to the aforementioned values. In addition, the batteries of the at least two battery banks (A8) can be of any type and composition, as long as they are in harmony with the other elements, wherein while one of the at least two battery banks (A8) is recharged for three hours, another of the at least two battery banks (A8) has a continuous operation of approximately five hours.

FIG. 1 also shows a set of contactors (A9) that allow the passage of energy from the at least two chargers (A12) and the at least two on-board chargers (A10) to the at least two battery banks (A8), which according to the programming contained in the programmable processing unit (B7), recharges every three hours to at least one of the at least two battery banks (A8), in each cycle, these also works at 12 volts. According to one embodiment of the present invention, other contactor or servo type current switch devices, controlled by the programmable processing unit (B7), may be used.

Figure 2:
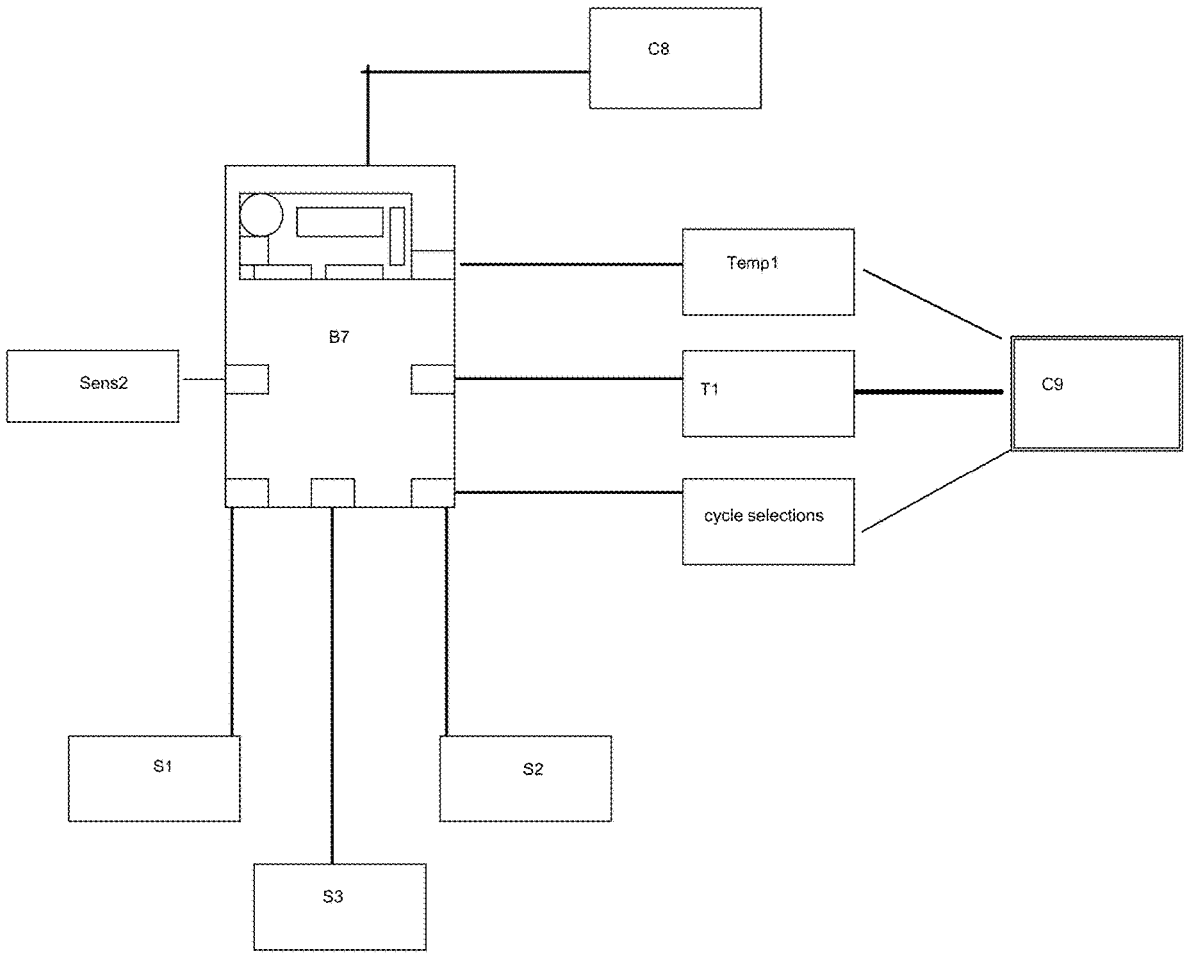
FIG. 2 shows a view of a programmable processing unit of the semi-autonomous power generation system.
Figure 3:
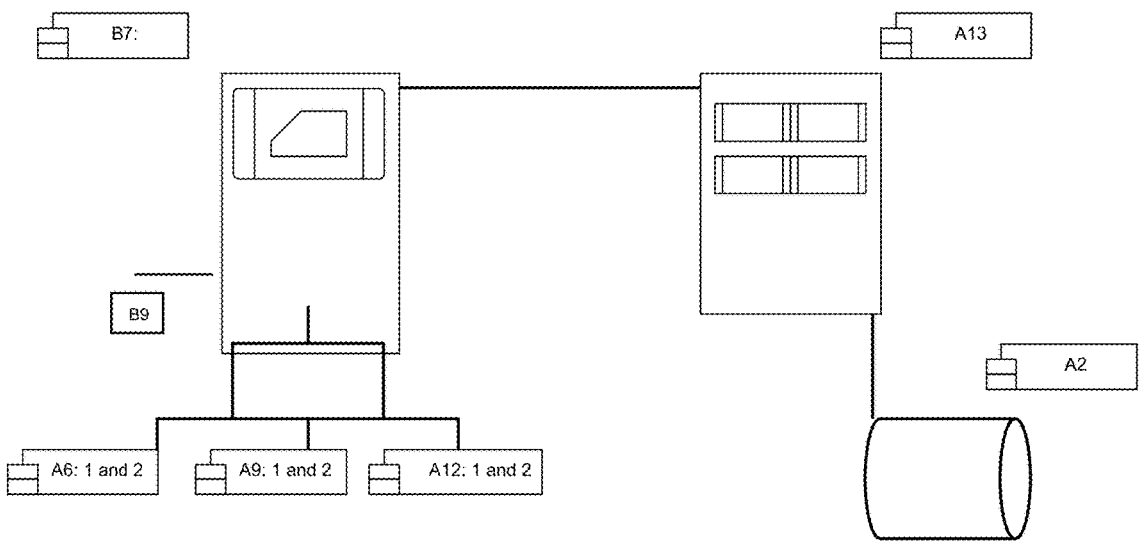
FIG. 3 shows a view of a programmable processing unit of the semi-autonomous power generation system.

In FIGS. 2 and 3 the programmable processing unit (B7) is connected to a temperature sensor (Temp1) and various sensors to enable optimal operation of the system (1). In addition, the programmable processing unit (B7) is connected to the at least two contactors (A6) and the at least two contactors (A9).

Moreover, according to the invention, the at least two on-board chargers (A10) of 6.6 kW along with the at least two chargers (A12) of 40 amperes facilitate recharging times, increasing the efficiency of operating cycles in a timely manner.

Moreover, the semi-autonomous electric power generation system (1) has at least one charge controller (AA10) (see FIG. 4), which is responsible for managing the recharging from the at least two chargers (A12), causing an increase in its capacity or being able to be replaced by another charger with greater power.

Figure 4:
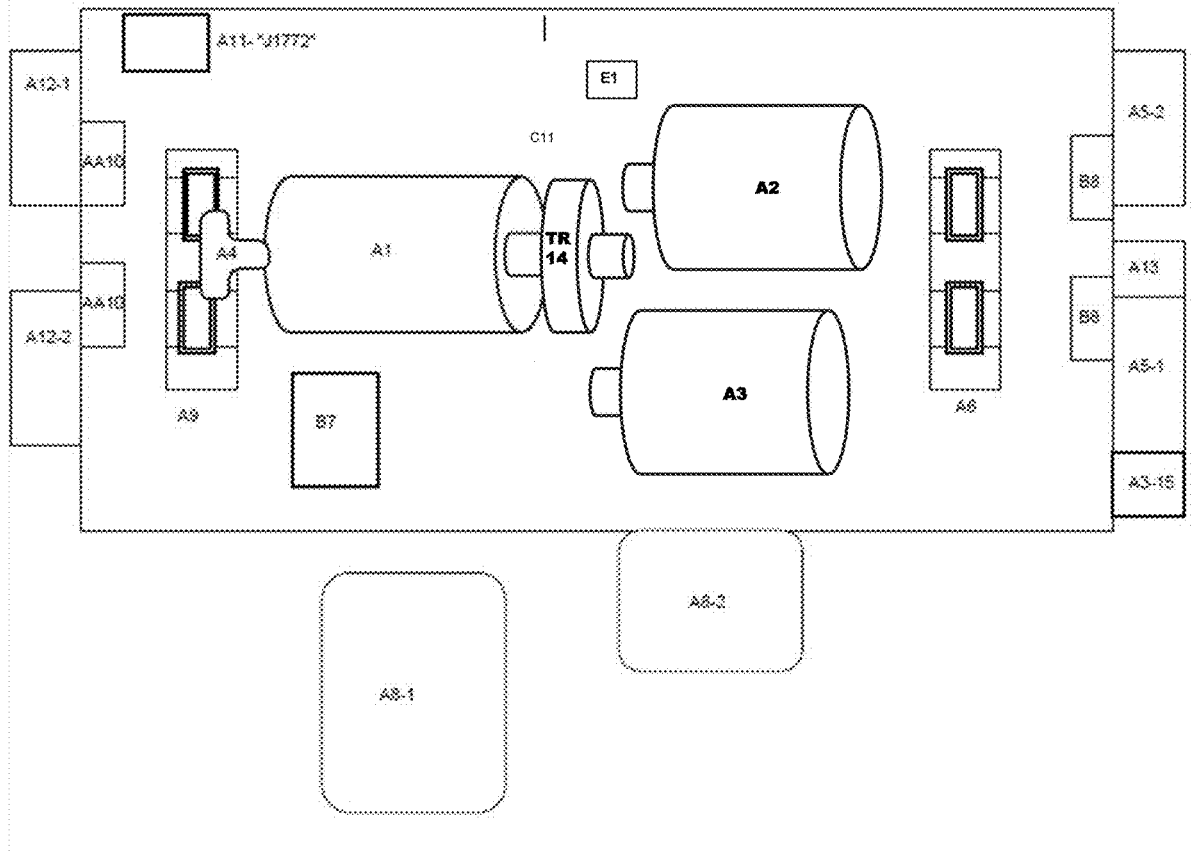
FIG. 4 shows a view of the motor and alternator arrangement of the semi-autonomous power generation system.
Figure 5:
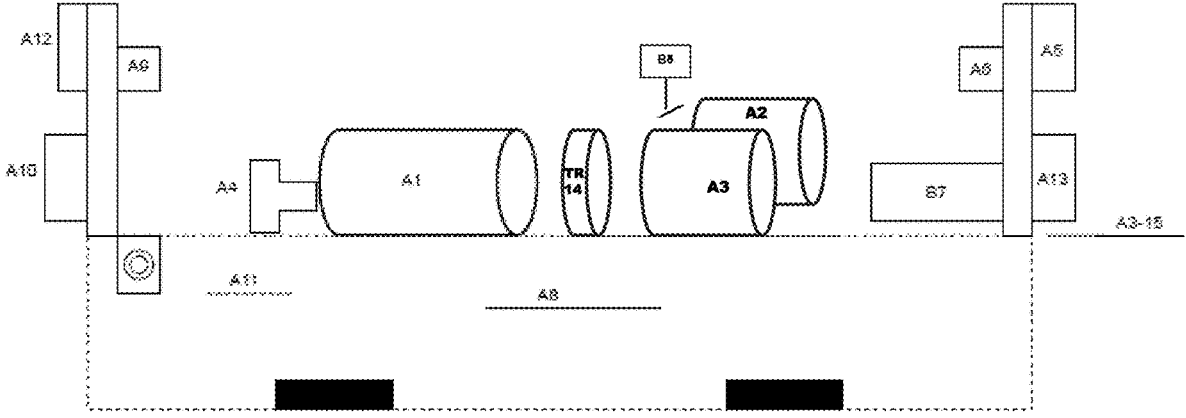
FIG. 5 shows another view of the motor and alternator arrangement of the semi-autonomous power generation system.

As can be seen in FIG. 4 and FIG. 5, in one embodiment of the invention, the electric motor (A1) is in series with the at least one service alternator (A2) and the at least one alternator or dynamo (A3), wherein the alternators (A2) and (A3) are parallel to each other.

According to the invention, the semi-autonomous electric power generation system (1) comprises a charging input (A11 type "j1772"), a very common element in electric vehicles, and this is the bridge between the at least two chargers (A12) and the at least two on-board chargers (A10), allowing the energy to pass through efficiently and safely.

The at least two chargers (A12) are level 2 chargers of 40 amperes, powered by the service alternator or dynamo (A2), since once the motor starts working the recharge cycle will start, said chargers (A12) are programmed to supply power every three hours due to the programmable processing unit (B7), which sends the recharging power signal to the at least two on-board chargers (A10) of 6.6 kW.

From FIG. 3 and FIG. 5 it is seen a fuse box (A13), which receives an energetic charge in the range of 220-240 volts, 50 amperes, from the service alternator or dynamo (A2), which is the power source that will power the at least two (A12) level 2 chargers of 40 amperes, which supply recharging to the at least two battery banks (A8), using the at least two on-board chargers (A10) of 6.6 kW.

In one embodiment of the system (1) to increase the power output of the electric motor (A1) there is a transmission (TR14) that can be composed of a gearbox, pulleys and belts, drive shafts, chains and pinions, depending on the power with which the generator is to be manufactured, for example, less than 100 kW, or hydrostatic transmissions of any type, variation or similar to hydrostatic transmissions driven by the battery-powered electric motor and a recharge and discharge exchange system to lighten the movement to drive the generators at the speed and torque necessary for their proper operation.

The electric power generation system (1) also comprises a battery management system (BMS) (A14), which is responsible for keeping the batteries in order and monitored so that the recharging system works properly in a timely manner. This battery management system (A14) is powered by a DC/DC converter (B10) as well as other elements, but this is powered by one of the at least two battery banks (A8) so as not to discharge less than 20% of all the aforementioned elements increasing their capacities, quantities, qualities, increasing the power of electricity generation. In addition, all programming systems that manage the elements will be connected to a resistant digital control display (C9) that will have pre-programmed cycles for off-duty work or continuous use schedules, information and markers, temperature control, as well as the option of an alternative power supply for the programmable processing unit (B7).

In another embodiment of the invention, the elements that comprise the semi-autonomous electric power generation system (1) are components commonly used in electric vehicles such as an AC/DC motor (A1), controllers (A5-1, A5-2), contactors, fuses, lines and terminals (B4), battery banks (A8-1, A8-2), as well as on-board chargers (A10-1, A10-2), and Level 2 chargers (A12-1, A12-2) of 40 amperes in addition to a box containing the programmable processing unit (B7), which is powered by a current inverter (C8) of 220 to 110 volts, whose source is the alternator or service dynamo (A2) which sends pulses to the contactors (A9-1, A9-2) which interrupt and cyclically connect the charging passage of the on-board charger (A10-1, A10-2) to the battery banks (A8-1, A8-2), and from the battery banks to the contactors (A6-1, A6-2), also cyclically managing the transition to the controllers (A5-1, A5-2) that drive the motor (A1), so that it moves the service alternator (A2) and the alternator or dynamo (A3), the service alternator (A2) that supplies the recharge and programs the generator to make the discharge and recharge changes and continue operating, the alternator or dynamo (A3) of 200 kW, 220 volts, or other powers and voltages that are designed, will provide electricity to the place, whether it is workshop, industry or wherever it is required.

There are additional elements, including, for example, terminals, cable lines, fuses, connections, which are indicated according to the elements used as they are variable in all their configurations just like other elements.

The capacity, resistance, quality and quantity of the elements that comprise the semi-autonomous electric power generation system (1) will be increased according to the required capacity, wherein the variants depend on the increase in power of the elements, without departing from the essence of the invention.

In one embodiment, the transmission (TR14) used in the semi-autonomous electric power generation system (1) can be a hydraulic transmission system (HE) of any type, different or similar to hydraulic transmissions driven by the electric motor powered by battery and a recharge and discharge exchange system to lighten the movement to drive the generators at speed and torque necessary for its proper functioning.

According to the invention, system (1) may comprise an alternative power supply. Wherein, according to the invention, the alternative power supply may be at least one of a battery of electrochemical cells, solar cells and current inverters, pulley and gear system, or combinations thereof.

The present invention also relates to a method of operation of a semi-autonomous electric power generation system (1), where the method involves providing and using a programmable processing unit (B7) (Arduino and PLC type) to hold the necessary instructions. From the instructions stored and/or programmed in the programmable processing unit (B7), electromagnetic pulses are sent to contactors (A9, A6) to make them change from an on state to an off state and vice versa, each time the signal is received from the programmable processing unit (B7) in each programmed period that allows to work in an immersive way managing the changes in the charging and discharging stages.

The method of the present invention comprises three main stages. The first stage (S1), which is the initial charging stage consists of providing an input (A11) (type: j1772) of the type commonly used in electric vehicles, recharging at least two battery banks (A8) that are connected to at least one charge controller (AA10) to manage the power of at least two on-board chargers (A10) to adjust the time and capacity, as required by the at least two battery banks (A8).

The method also involves keeping the batteries of the at least two battery banks in order and monitored by means of a battery management system (BMS) (A14) so that the charging system works properly in a timely manner.

The method also involves powering several elements by means of a DC/DC converter (B10), and wherein the converter (B10) is powered by one of the at least two battery banks (A8) to avoid discharging to less than 20% of all the aforementioned elements, thus increasing their capacities, quantities, qualities, and increasing the power of electricity generation. The method comprises connecting all the programming systems that manage the elements to a resistant digital control display (C9) that will have pre-programmed cycles for shutdown work schedules or continuous use, information and markers, temperature control as well as the alternative power option of the programmable processing unit (B7), wherein the temperature can be manually or automatically adjusted thanks to a thermometer connected to the programmable processing unit (B7) (Arduino or PLC type) in which the desired temperature, the management cycle of the contactors (A6) and (A9) of 12 volts, and of a relay (B9) of 240 volts will be programmed. The pre-programmed operating modes send pulses that will synchronously make the relevant changes in a timely manner, managing the change times of the at least two chargers (A12) that supply the power for the at least two on-board chargers (A10) to recharge the at least two battery banks (A8) indicated by the contactors (A6) that receive the order from the programmable processing unit (B7), the one that releases the energy from the at least two battery banks (A8) to the at least two controllers (A5) that manage the power of the motor (A1), but this time it will be the contactors (A9), which give access to the energy that will power the indicated controller (A5). In accordance with the method of the present invention, a potentiometer (B8) is adjusted to conform to the RPM required by the service alternator (A2) and alternator or dynamo (A3), the value of which is commonly between 1800 rpm and 1600 rpm, respectively. Depending on the required capacity, the motor (A1) is programmed, for example, but not limited, the motor activated at 1800 rpm, sustains the voltage of the service alternator (A2) and the alternator or dynamo (A3), once recharged the operation starts and that start cycle is programmed by means of the programmable processing unit (B7) (Arduino or PCL type) and other improved programmable devices. After three hours, the 12 volt contactor (A6) programmed by the programmable processing unit (B7) is activated, allowing the input of power from at least one of the at least two battery banks (A8), which was previously charged for three hours via the input (A11) type "j1772", to the corresponding controller (A5), which manages the power from the batteries from the battery banks (A8) to the motor (A1), which drive the service alternator (A2), which provide the electricity to keep the programmable processing unit (B7) and fuse box (A13) working, to the level 2 chargers (A12) of 40 amperes, which keep the at least two battery banks (A8) recharged, by means of contactors (A9) whose program comes from the programmable processing unit (B7), to make the change of bank, i.e. from the bank to recharge and bank to discharge.

The second stage (S2) of the method of the present invention is initiated after the completion of the first stage, i.e. five hours later, for example, recharging the battery banks (A8) will carry on for three hours, then the contactors (A6) will allow the power of the bank of the at least two recharged battery banks (A8) to pass to the controller (A5) assigned in accordance with the programmable processing unit (B7), thus keeping the motor in motion, wherein contactor changes (A6) will be synchronized with the battery bank of the at least two battery banks (A8) recharged, to keep the elements in motion, in a timely manner.

The third stage (S3) of the method of the present invention comprises, after the initial recharging, to power the electric motor (A1) efficiently by means of the battery banks (A8) which continue to be recharged (three hours) each time one is discharged by keeping the electric motor (A1) in motion in conjunction with a transmission (TR14) for five hours. The transmission (TR14) may consist of a gearbox, pulleys and belts, drive shafts, chains and sprockets, or the like, depending on the power with which the generator is to be manufactured, for example, but not limited to, less than 100 kW, or hydrostatic, hydraulic or any other type of transmissions falling within the technical field of the invention, variant or similar to hydrostatic transmissions driven by the electric motor (A1) powered by one battery bank of the at least two battery banks (A8) and a recharge and discharge exchange system to lighten the movement achieving through said transmission (TR14) to increase the necessary power to drive the generators at the speed and torque necessary for their proper operation, which first drive the service alternator (A2), of at least 10 kW, maximum 30 kW, 220-240 volts, which power the recharging and discharging management device, in this case to the programmable processing unit (B7), through the contactors (A9) and (A6) and level 2 chargers (A12), and on-board charger (A10) of 6.6 kW, and charging the battery banks (A8), and secondly the alternator or dynamo (A3), for example but not limited to, 220 volts, 60 Hz, 200 kW, 1800 rpm which will be powered by the electric motor (A1) which generates the electrical power required on site, through a multi-vector fuse box that is the power supply of the site in question, for example but not limited to: a 200 hp, 6000 rpm, 280 lbf, 260 volt AC motor, which will be connected to a terminal block (A4) type (T) wherein the electric motor (A1) receives the current from the at least two controllers (A5).

In one embodiment of the method of the present invention, at least two controllers (A5) (i.e., A5-1, A5-2) of 2000 amperes, 348 volts each one, are powered by the at least two contactors (A6) of 12 volts (i.e., A6-1, A6-2) which allows the passage of electrical power in a programmed manner to the controller (A5-1) in turn, while the controller (A5-2) waits for one (A8-1, A8-2) of the at least two battery banks (A8) to recharge on the recharging turn, which receives recharging from one of the at least two level 2 chargers (A12), plus the on-board charger (A10-2) and the charge controller (AA10) according to the programmed recharge turn, provided by the contactors (A6-2) and the programmable processing unit (B7), the chargers (A12) and (A10) are waiting to be reactivated by one (A8-1, A8-2) of the at least two battery banks (A8) empty, once one (A8-1, A8-2) of the at least two battery banks (A8) has been recharged, the contactor (A6-2) will be responsible for supplying the power to the electric motor (A1), which keep the electric motor rotating at the rhythm and time indicated by one of the at least two controllers (A5), so that the service alternator (A2) and the alternator or dynamo (A3) continue to generate energy thanks to the movement of the motor (A1) and all the elements comprised by it.

In one embodiment of the present invention, the semi-autonomous electric power generation system (1) has at least two different forms of emergency ignition, one is powered by solar cells and a current inverter that recharge the battery from the initial charge, and activate other electrical devices such as contactors (A6) allowing the passage of energy from one of the at least two battery banks (A8-1, A8-2) to the electric motor (A1), so that the recharge and discharge cycles are initiated, in order to achieve its ignition. The second form corresponds to a gear system, which has a manual start system that is coupled to a sprocket (C11), which moves the mechanisms to start the generator since the sprocket (C11) is coupled to the shaft of the electric motor (A1), so when turning the manual starter (E1) it will move the service alternator (A2), which will supply the electrical energy through an inverter (C8) to start the generator.

All the elements that comprise the operation of the generator in question will be installed on a base of rigid materials such as all types of steel and metals, as well as all their variants, alloys and presentations, as well as plastics of all types of composition, as well as fibers, whether made of glass, carbon and other fibers and rigid petroleum derivatives, as well as some woods. The elements that make up the semi-autonomous electric power generation system vary in capacity, resistance, quantity, quality, as well as programming times depending on the configuration of the device in its settings, variants and sizes. The housing (E3) on the outside can be made of all types of plastics, fibers, steels and woods or any material that does not interfere with the operation of the system and that offers protection against weather or any environmental risk, within a design that allows it to be safe from water. The cooling system (CS) comprised by the system (1) consists of a set of fans that cool all the elements, where the fans are driven by a 12 volt DC/DC inverter (C8), which are obtained from the dynamo service alternator (A2), the heating system will also operate at 240 volts which are also obtained from the service alternator (A2), the cooling and heating system will be linked to a program that is chosen at the time of programming its operation in the programmable processing unit (B7) and which is visible on the digital control display (C9) which aligns the elements so that they work smoothly and in harmony, connects the installation to be supplied, activates the ignition device (C6) and chooses the ignition of your preference, chooses the program that best suits the needs of the end user, as well as the operating temperature, all times are programmed in the programmable processing unit (B7) so that the functions of all the elements that comprises the semi-autonomous electric power generation system (1) are synchronized, wherein the efficiency of the electric motor (A1) works at 100 kW electrical output for 75 hp, when the other important elements are increased, a higher electrical output is obtained.

Similar elements are indicated by similar reference numbers.

LIST OF ITEMS

A1: electric motor
A2: Service alternator
A3: Alternator or dynamo.

A4: T-type terminal block
A5: Controller
A5-1: Controller
A5-2: Controller
A6: Contactors
A6-1: Contactors
A6-2: Contactors
A7: Fuses
A8: Battery bank
A9: Contactor Set
A10: On-board charger
A10-1: On-board charger
A10-2: On-board charger
A11: input "J1772"
A12: Level 2 or Level 3 charger
A12-1: Level 2 or Level 3 charger
A12-2: Level 2 or Level 3 charger
A13: Fuse box
A14: Battery Management System (BMS)
AA10: Charge Controller
B1: Starting system
B7: Programmable processing unit
B8: potentiometer
B9: Relay
B10: Converter
C6: Ignition Device
C8: current inverter
C9: Digital Control Display
C11: Sprocket
CS: Cooling System
E1: Manual Starter
E3: Housing
H1: Hydraulic system
Sens2: Sensor
Temp1: Temperature Sensor
T1: Temperature indicator
TR14: Transmission

What is claimed:

1. A semi-autonomous electric power generation system (1), for the generation of electrical energy, comprising:
a) a housing (E3) which comprises:
b) at least one electric motor (A1), provided to receive power supply from one battery bank (A8), and which is connected to a T-type terminal block (A4);
c) at least one transmission (TR14), to drive the motor (A1) and potentiate the speed of the shaft;
d) at least one service alternator (A2), arranged in series with the electric motor (A1);
e) at least one alternator or dynamo (A3), wherein the service alternator (A2) and the at least one alternator (A3) are arranged in parallel therebetween;
f) at least two self-recharging battery banks (A8), in connection with a battery management system (A14) for monitoring the charge of the at least two self-recharging battery banks (A8);
g) at least one controller (A5) to manage the power of the at least one electric motor (A1);
h) at least two on-board chargers (A10), to recharge the at least two self-recharging battery banks (A8);
i) at least two chargers (A12), which are in communication with the at least two self-recharging battery banks (A8);
j) at least two contactors (A6), which are controlled by a programmable processing unit (B7),
k) fuses (A7) contained inside of at least one fuse box (A13);

l) at least two contactors (A9) to allow the passage of energy from the at least two chargers (A12) and the at least two on-board chargers (A10) to the at least two rechargeable battery banks (A8),
m) at least one charge controller (AA10), connected to the at least two battery banks (A8) and provided for managing the recharging from the at least two chargers (A12);
n) at least one charge input (A11) (type: j1772), provided for recharging the at least two battery banks (A8),
o) at least one temperature indicator (T1), to monitor the temperature of the system during the functioning,
p) a cooling system (CS), provided for cooling the at least one controller (A5),
q) at least one alternative power source,
r) a resistant digital control display (C9) for connecting all programming systems, and
s) circuitry;
wherein the programmable processing unit (B7) is configured to monitor that the discharge value of the at least two battery banks (A8) is not less than 20% of the total charge.

2. The semi-autonomous electric power generation system (1) according to claim 1, wherein the at least one electric motor (A1) has power of 200 hp, at 6000 rpm, 250 volts and 500 amperes.

3. The semi-autonomous electric power generation system (1) according to claim 1, wherein the transmission (TR14) is one of the mechanical or hydrostatic type, or wherein the transmission (TR14) of the electric power generation system (1) is a hydraulic system (H1) connected between the electric motor and the alternators, and wherein the hydraulic system (H1) comprises a hydraulic pump and motor or wherein the transmission (TR14) is one of a gearbox, pulleys and belts, drive shafts, chains and pinions, or a hydrostatic transmission or hydraulic motor.

4. The semi-autonomous electric power generation system (1) according to claim 1, wherein further the at least one electric motor (A1) is of 75 hp or 100 hp.

5. The semi-autonomous electric power generation system (1) according to claim 1, wherein the material of the housing (E3) is at least one selected from metal, steel, metal alloys, plastic, synthetic fibers, wood, or combinations thereof.

6. The semi-autonomous electric power generation system (1) according to claim 1, wherein at least one of the service alternator (A2) and the alternator or dynamo (A3) is of 110 volts and at least the other of the service alternator (A2) and the alternator or dynamo (A3) is of 220 volts.

7. The semi-autonomous electric power generation system (1) according to claim 1, wherein the at least one alternative power source is one of an electrochemical cell battery, solar cells and current inverters, pulley and gear system.

8. The semi-autonomous electric power generation system (1) according to claim 1, wherein the at least one cooling system (CS) is at least one of a fan assembly, cooling system, or combinations thereof.

9. The semi-autonomous electric power generation system (1) according to claim 1, wherein the batteries of the at least two battery banks (A8) is at least one of lithium battery, Al-air battery, hydrogen battery, metal-ion battery, lead acid battery, or combinations thereof.

10. The semi-autonomous electric power generation system (1) according to claim 1, wherein the at least one programmable processing unit (B7) is one of the Arduino or PLC unit.

11. A method for using a semi-autonomous electric power generation system (1), which comprises the following steps:

a) providing the semi-autonomous electric power generation system as claimed in claim 1;

b) providing and using a programmable processing unit (B7) configured to hold the operation instructions, c) from the instructions stored and/or programmed in the programmable processing unit (B7), sending electromagnetic pulses to contactors (A9, A6) to change them from an on state to an off state and vice versa, d) each time the signal is received from the programmable processing unit (B7) in each programmed period, managing changes in recharge and discharge stages, wherein the method comprises three main stages, the first stage (S1), consists of:

e) providing an input charger (A11) that is configured for use with electric vehicles, f) recharging at least two battery banks (A8) that are connected to at least one charge controller (AA10) to manage the power of at least two on-board chargers (A10) to adjust the time and capacity required by the at least two battery banks (A8), g) keeping, by means of a battery management system (BMS) (A14), the batteries of the at least two battery banks (A8) in order and monitored for the proper functioning of the recharging system, h) powering by means of a DC/DC converter (B10) to several elements, and wherein the converter (B10) is powered by one of the at least two battery banks (A8), i) connecting all programming systems that manage the elements to a resistant digital control display (C9) having pre-programmed cycles for work schedules or continuous use off, information and markers, temperature control as well as the alternative power option of the programmable processing unit (B7), wherein the temperature is adjusted manually or automatically using a thermometer connected to the processing unit programmable (B7) in which the desired temperature is programmed, the management cycle of the contactors (A6) and (A9) of 12 volts, and of a relay (B9) of 240 volts, j) sending pulses that synchronously perform changes in a timely manner, managing the changeover times of the at least two chargers (A12) that supply the power for the at least two on-board chargers (A10) to recharge the at least two battery banks (A8) indicated by the contactors (A6) that receive the order from the programmable processing unit (B7), k) delivering energy from the at least two battery banks (A8) to the at least two controllers (A5) that manage the power of the motor (A1), l) programming to sustain the voltage of the service alternator (A2) and the alternator or dynamo (A3), wherein, once recharged, operation is started and a start cycle is programmed by means of the programmable processing unit (B7)

m) after three hours, activating the 12 volts contactor (A6) programmed by the programmable processing unit (B7), allowing the input of power from at least one of the at least two battery banks (A8), which was previously charged for three hours through the input (A11) (type "j1772"), to the corresponding controller (A5), which manages the energy of the batteries from the battery banks (A8) to the motor (A1), n) driving the service alternator (A2), which will provide the electricity to keep the programmable processing unit (B7) and fuse box (A13) on, to the level 2 chargers (A12) of 40 amperes, which keep the at least two battery banks (A8) recharged, by means of the contactors (A9) whose program comes from the programmable processing unit (B7), for performing change of the battery bank, wherein the second stage consists of:

o) allowing contactors (A6) to manage power from one bank of the at least two battery banks (A8) recharged, and pass said power to the controller (A5) assigned in accordance with the programmable processing unit (B7), p) keeping the motor in motion, wherein the changes of contactor (A6) is synchronized with the battery bank of the at least two battery banks (A8) recharged, to keep the elements moving, in a timely manner, wherein the third stage consists of:

q) powering the electric motor (A1) by means of the battery banks (A8) which continue to be recharged (three hours) each time one is discharged by keeping the electric motor (A1) in motion in conjunction with a transmission (TR14) for five hours, r) driving the transmission (TR14) by means of the electric motor (A1) which is powered by one battery bank of the at least two battery banks (A8) and a recharge and discharge exchange system to increase the power output of the motor (A1) and lighten the movement to drive the generators at the speed and torque for their proper operation, s) driving, in first place, the service alternator (A2) to power the recharge and discharge management device, through the contactors (A9) and (A6) and level 2 chargers (A12), and on-board charger (A10), charging the battery banks (A8), and secondly, by means of the electric motor (A1) generating the required electrical power on site, which will be connected to a terminal block (C7) type (T) wherein the electric motor (A1) receives the current from the at least two controllers (A5), and t) setting that the discharge value of the at least two battery banks (A8) is not less than 20% of the total charge.

12. The method according to claim 11, wherein further the method comprises adjusting a potentiometer (B8) to the RPM required by the service alternator (A2) and alternator or dynamo (A3), wherein the value of the RPM required by the service alternator (A2) and alternator or dynamo (A3) is between 1800 rpm and 1600 rpm, respectively.

13. The method according to claim 11, wherein the service alternator (A2), is at least 10 kW, maximum 30 kW, 220-240 volts and wherein the alternator or dynamo (A3), is one of 220 volts, 60 Hz, 200 kW, 1800 rpm.

14. The method according to claim 11, wherein at least one of the at least two controllers (A5) is powered by one of the at least two contactors (A6) of 12 volts, while the other one of the at least two controllers (A5) wait for one of the at least two battery banks (A8) to recharge at a recharging turn.

15. The method according to claim 11, wherein one of the at least two chargers (A12), the on-board charger (A10) and the charge controller (AA10) depending on a scheduled recharging turn, are waiting to be reactivated by one of the at least two battery banks (A8) empty, wherein once one of the at least two battery banks (A8) has been recharged, supplying the energy to the electric motor (A1) through the contactor (A6), which will keep the electric motor rotating at the rhythm and time indicated by one of the at least two controllers (A5), so that the service alternator (A2) and the alternator or dynamo (A3) continue to generate energy.

16. The method according to claim 11, wherein the semi-autonomous electric power generation system (1) is powered by solar cells and a power inverter that recharge the battery from the initial charge and activate other electrical devices such as contactors (A6) allowing the passage of power from one of the at least two battery banks (A8-1, A8-2) to the electric motor (A1) or can be powered by a gear system, which has a manual start system (E1) that is coupled to a sprocket (C11).

\* \* \* \* \*